(12) United States Patent
Frei et al.

(10) Patent No.: US 12,729,294 B2
(45) Date of Patent: Sep. 8, 2026

(54) POLYMER FIBERS FOR CONCRETE REINFORCEMENT

(71) Applicant: SIKA TECHNOLOGY AG, Baar (CH)

(72) Inventors: Fabian Frei, Weehawken, NJ (US); William Durall, Northport, AL (US); Carl Labbe, Chattanooga, TN (US)

(73) Assignee: SIKA TECHNOLOGY AG, Baar (CH)

( * ) Notice: Subject to any disclaimer, the term of this patent is extended or adjusted under 35 U.S.C. 154(b) by 938 days.

(21) Appl. No.: 17/918,755

(22) PCT Filed: Jun. 17, 2021

(86) PCT No.: PCT/EP2021/066515
§ 371 (c)(1),
(2) Date: Oct. 13, 2022

(87) PCT Pub. No.: WO2021/255208
PCT Pub. Date: Dec. 23, 2021

(65) Prior Publication Data

US 2023/0130331 A1 Apr. 27, 2023

(30) Foreign Application Priority Data

Jun. 17, 2020 (EP) .................................... 20180543

(51) Int. Cl.
*C08L 23/12* (2006.01)
*D01D 5/088* (2006.01)
(Continued)

(52) U.S. Cl.
CPC ............ *C08L 23/12* (2013.01); *D01D 5/0885* (2013.01); *D01D 5/253* (2013.01); *D01F 6/06* (2013.01);
(Continued)

(58) Field of Classification Search
CPC ...... C08L 23/12; D01D 5/0885; D01D 5/253; D01D 5/06; D01F 6/06; D01F 8/06;
(Continued)

(56) References Cited

U.S. PATENT DOCUMENTS 6,423,134 B1 7/2002 Trottier et al.
2002/0018895 A1 2/2002 Pyzik et al.
2014/0011030 A1 1/2014 Kawakami

FOREIGN PATENT DOCUMENTS

GB 2295833 A 6/1996
JP 2018-203557 A 12/2018
(Continued)

OTHER PUBLICATIONS

Wu Liuxing, "Highway Bridges and Maintenance", China Textile & Apparel Press, Feb. 29, 2020, p. 204-205.
(Continued)

*Primary Examiner* — Catherine S Branch
*Assistant Examiner* — Olga Lucia Donahue
(74) *Attorney, Agent, or Firm* — Oliff PLC

(57) ABSTRACT

A macro-synthetic fiber includes three or more partially fused filaments made of a polymer composition including at least one polypropylene, wherein the fiber has a multi-lobal cross-sectional shape with three or more lobes. A method produces macro-synthetic fibers, a cementitious material includes a binder and macro-synthetic fibers, and a method for forming a concrete surface uses a concrete mixture modified with the macro-synthetic fibers.

17 Claims, 2 Drawing Sheets

(51) Int. Cl.
*D01D 5/253* (2006.01)
*D01F 6/06* (2006.01)
*D02G 1/12* (2006.01)
*E04C 5/07* (2006.01)

(52) U.S. Cl.
CPC ............... *D02G 1/12* (2013.01); *E04C 5/073* (2013.01); *D10B 2321/021* (2013.01); *D10B 2321/022* (2013.01); *D10B 2401/00* (2013.01); *D10B 2401/063* (2013.01); *D10B 2505/02* (2013.01)

(58) Field of Classification Search
CPC . D02G 1/12; D02G 1/14; E04C 5/073; D10B 2321/021; D10B 2321/022; D10B 2401/00; D10B 2401/063; D10B 2505/02
See application file for complete search history.

(56) References Cited

FOREIGN PATENT DOCUMENTS

| | | | |
|---|---|---|---|
| WO | 2006/133150 | A1 | 12/2006 |
| WO | 2018/094185 | A1 | 5/2018 |

OTHER PUBLICATIONS

Sep. 30, 2021 International Search Report issued in International Patent Application No. PCT/EP2021/066515.
Sep. 30, 2021 Written Opinion issued in International Patent Application No. PCT/EP2021/066515.

POLYMER FIBERS FOR CONCRETE REINFORCEMENT

TECHNICAL FIELD

The invention relates to polymeric fibers for use in construction materials, particularly in cementitious compositions. In particular, the invention relates to macro-synthetic fibers, which are capable of undergoing a progressive fibrillation when mechanically agitated within a matrix material to be reinforced.

BACKGROUND ART

Concrete is the most commonly used man-made construction material for structural applications in the world. Generally, concrete is a brittle material having a high compressive strength but low tensile strength (crack strength). The tensile strength of concrete can be increased by using modifying additives, such as rebar and reinforcing meshes. Polymeric, metal, glass, and natural fibers have also been used to improve the tensile strength (strength before first crack occurs) and toughness (resistance to cracking) of concrete.

Different types of fibers can be used to improve specific properties of concrete. Synthetic microfibers (microfibers) having a linear density of not more than 580 denier (den) are typically used to prevent plastic shrinkage cracking as the concrete sets, i.e. to prevent micro-cracking of the concrete during the first 24 to 48 hours after casting. Macro-synthetic fibers (macrofibers) having a linear density of greater than 580 den and diameters of equal or greater than 0.3 mm are added to concrete compositions to improve overall toughness quantified by measurements of residual strength after first break has occurred. Macrofibers are typically added to concrete mixtures at fiber dosages of 1.8 to 8.9 kg/m$^3$. Macrofibers are available in various shapes, such as rope, tape or stick and they may be twisted, serrated or embossed to enhance mechanical bonding to concrete. The concrete reinforcement properties of synthetic fibers depend on both the strength of the fiber and on the adhesion between the fiber and the concrete matrix.

The benefits obtained with fiber-reinforced concrete has led to the widespread use of fibers in lieu of conventional temperature and shrinkage reinforcement as well as toughness in many applications, including slab-on-ground. Commonly used plastic materials for concrete reinforcement fibers include polypropylene (PP), polyethylene (PE), polyethylene terephthalate (PET), aramids, for example Kevlar, polyamides, and polyvinyl alcohol fibers. All of these suffer from one or more disadvantages, such as high cost, low alkaline resistance, low tenacity or low interfacial bonding between the concrete matrix and the fiber. Polypropylene and polyethylene have been widely used as raw material for both micro and macrofibers. Their advantages include easy processability to fibers through melt-spinning (extrusion) processes, low cost, and high resistance in alkaline environment. However, due to the low density and hydrophobicity the fibers tend to bloom to the surface during finishing, i.e. the fibers tend to protrude from the surface of the concrete before completion of curing. Furthermore, polypropylene and polyethylene do not bond well to concrete, and therefore, these types of macrofibers are typically crimped or embossed to enable mechanical bonding to the matrix. The interfacial bonding between the fiber and concrete can be controlled by using coatings applied to the surface of the fibers or by chemical modification of the fiber surface.

However, these methods typically result in increased costs and complexity of the fiber production process.

Larger fibers in terms of fiber aspect ratio are generally more suitable than small fibers for use in improving the toughness of the concrete. Thicker fibers have higher breaking force, but they also provide less interfacial bonding to concrete due to the reduced surface area. Bonding properties of fibers can generally be improved by using longer and thinner fibers. However, longer and thinner fibers tend to clump together in balls (balling) that are difficult to break when added to concrete. Resistance to balling can be improved by using fibers that are pre-packed in "pucks" and/or by using fibers that fibrillate into many smaller fibers when mechanically agitated within a matrix material to be reinforced with the fibers. Fibrillation increases the surface area of the fibers resulting in improvement of the interfacial bonding to concrete. However, excessive fibrillation may lead to problems with workability, fiber distribution, and mixing and reduce the toughness enhancement properties of larger fibers.

Surface finish requirements in slab on grade applications vary depending on traffic, texture, indoor or outdoor, or cosmetic appeal requirements. For most indoor concrete and composite metal decks, smoother hard steel troweled finishes are required. These smooth finishes are important for various reasons, such as reduction of surface wear, ease of cleaning, and long-term durability. Concrete reinforced with macrofibers in hard steel troweled applications can leave many fibers on the surface, which is an undesirable outcome for the users due to its appearance. A concrete reinforcing fiber having a low tendency to protrude from the surface of the concrete before completion of curing would, therefore, be highly valuable in slab on grade applications in order to enable a smooth surface finish.

It would therefore be desirable to provide a low-cost macro-synthetic fiber suitable for use in improving specific properties of concrete, particularly the overall toughness and durability of concrete, without having negative impact on other properties, such as surface finishing characteristics and/or esthetic appeal.

SUMMARY OF THE INVENTION

The objective of the present invention is to provide a macro-synthetic concrete reinforcing fiber, which solves one or more problems of the prior art macro-synthetic fibers.

Another objective of the present invention is to provide a low-cost macro-synthetic fiber, which is highly effective in improving the toughness and durability of concrete, exhibits a good dispersibility in a concrete mixture and good surface finishing properties.

It was surprisingly found that a macro-synthetic fiber consisting of three or more partially fused filaments, wherein the filaments are made of a polymer composition comprising at least one polypropylene, can solve or at least mitigate many of the problems related to the use of the macro-synthetic fibers of prior art.

The subject of the present invention is a macro-synthetic fiber as defined in claim 1.

One of the advantages of the macro-synthetic fiber of the present invention is that the fibers have consistent self-fibrillating properties. Once the fiber is introduced into a concrete mixture, it breaks apart into pre-determined parts (filaments) during the mixing process. The breakage increases the contact area between the concrete matrix and fiber, and further randomizes the orientation of the fiber. Due to the consistent self-fibrillating properties, the fibers can be easily incorporated into a fluidized concrete mixture with low aspect ratio of <100 to avoid problems related to dispersion (balling) while still obtaining the improved concrete properties, particularly concrete toughness, through the higher aspect ratio of the individual filaments separated from the fiber during the mixing process.

Another advantage of the macro-synthetic fiber of the present invention is that the fibers can be mixed in concrete compositions to improve toughness without having a negative impact to surface finishing characteristics in slab on grade applications. The number of fibers remaining on a surface of a concrete slab in hard steel troweled applications can be significantly reduced or even eliminated by using the fibers of the present invention.

Other subjects of the present invention are presented in other independent claims. Preferred aspects of the invention are presented in the dependent claims.

DETAILED DESCRIPTION OF THE INVENTION

Figure 1:
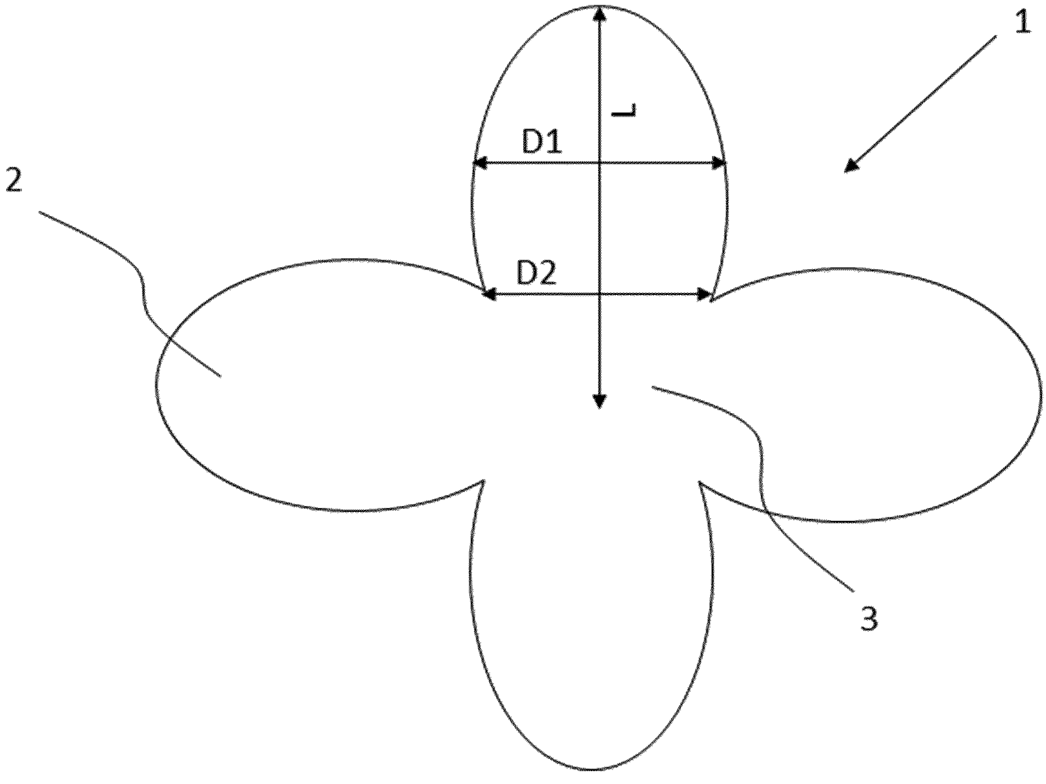
FIG. 1 shows schematically one possible cross-sectional shape of a macro-synthetic fiber according to the present invention.

The subject of the present invention is a macro-synthetic fiber consisting of three or more partially fused filaments made of a polymer composition comprising at least one polypropylene, wherein said fiber has a multi-lobal cross-sectional shape with three or more lobes.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "propylene copolymer" refers to copolymers comprising at least 50 wt.-%, more preferably at least 60 wt.-% of propylene-derived units, based on the weight of the copolymer whereas the term "ethylene copolymer" refers to copolymers comprising at least 50 wt.-%, more preferably at least 60 wt.-% of ethylene-derived units, based on the weight of the copolymer.

The term "melting temperature" refers to a temperature at which a material undergoes transition from the solid to the liquid state. The melting temperature ($T_m$) is preferably determined by differential scanning calorimetry (DSC) according to ISO 11357 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The "amount or content of at least one component X" in a composition, for example "the amount of the at least one thermoplastic polymer P1" refers to the sum of the individual amounts of all thermoplastic polymers P1 contained in the composition. For example, in case the composition comprises 20 wt.-% of at least one thermoplastic polymer P1, the sum of the amounts of all thermoplastic polymers P1 contained in the composition equals 20 wt.-%.

The term "normal room temperature" refers to the temperature of 23° C.

The macro-synthetic fiber of the present invention consists of three or more partially fused filaments made of a polymer composition comprising at least one polypropylene. The expression "partially fused" is understood to mean in the context of the present invention that the macro-synthetic fiber has been obtained by using a process comprising extruding a molten polymer composition to provide extruded filaments, which are allowed to get into contact over a portion of their primary exterior surfaces and to partially fuse with each other to form an undrawn fiber. The term "primary exterior surface" of a filament refers to the longitudinally extending surface of said filament.

Fibers composed of partially fused filaments differ significantly from fibers composed of single filament (monofilament fibers) and from multi-filament fibers, where the filaments have been joined to each other adhesively or mechanically.

According to one or more embodiments, the macro-synthetic fiber has been obtained by using a process comprising extruding a molten polymer composition through an extruder die comprising a plurality of orifices to provide undrawn fibers, wherein at least part of said orifices consist of an assembly of three or more holes that are proximately disposed but not overlapping each other such that when the molten polymer composition is extruded through said holes, the thus obtained extruded filaments are partially fused to form an undrawn fiber. The expression "overlapping each other" is understood to mean that the distance between adjacent holes of said assembly is such that the perimeters of the holes are not intersecting each other.

Due to the partially fused filament structure, the fibers of the present invention are capable of undergoing progressive fibrillation when mechanically agitated within a matrix to be reinforced with the fibers. The first part of the fibrillation occurs during the early stage of mixing, which gives the fibers additional time to disperse within the matrix. The second part of the fibrillation happens after considerable mixing when significant portion of the fibers have already been distributed into the matrix, which decreases the tendency of the individual filaments separated from the fibers to clump together in balls.

Multi-filament fibers of prior art have generally been found out to have disadvantageous fibrillation properties. Some multi-filament fibers have been found out to exhibit incomplete fibrillation and fraying of fiber ends during mixing within concrete, which results in increased fiber entanglement and thus balling of the fibers. In other cases, separation of filaments from the center of the fiber and/or fraying of fiber ends have been found out to occur prior to the first stage of mixing, which also results in increased problems with entanglement and balling of the fibers during the mixing within concrete.

Furthermore, monofilament fibers having multi-lobal cross-section have been found out to exhibit insufficient fibrillation when mixed within concrete.

Preferably, the at least one polypropylene comprises at least 70 wt.-%, more preferably at least 75 wt.-% of the polymer composition. According to one or more embodiments, the at least one polypropylene comprises 70-95 wt.-%, preferably 75-90 wt.-%, more preferably 80-90 wt.-%, of the total weight of the polymer composition.

The type of the at least one polypropylene and the at least one polyethylene is not particularly restricted in the present invention.

Suitable polypropylenes include polypropylene homopolymers (hPP), such as isotactic polypropylene (iPP) and syndiotactic polypropylene (sPP), and propylene copolymers, such as heterophasic propylene copolymers, propylene random copolymers, and propylene block copolymers.

Heterophasic propylene copolymers are heterophasic polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Suitable commercially available heterophasic propylene copolymers include reactor blends of the base polyolefin and the polyolefin modifier, also known as "in-situ TPOs" or "reactor TPOs or "impact copolymers (ICP)", which are typically produced in a sequential polymerization process, wherein the components of the matrix phase are produced in a first reactor and transferred to a second reactor, where the components of the dispersed phase are produced and incorporated as domains in the matrix phase. Heterophasic propylene copolymers comprising polypropylene homopolymer as the base polymer are often referred to as "heterophasic propylene copolymers (HECO)" whereas heterophasic propylene copolymers comprising polypropylene random copolymer as the base polymer are often referred to as "heterophasic propylene random copolymers (RAHECO)". The term "heterophasic propylene copolymer" encompasses in the present disclosure both the HECO and RAHECO types of the heterophasic propylene copolymers.

According to one or more embodiments, the at least one polypropylene has

- a flexural modulus determined according to ISO 178:2019 standard of at least 1000 MPa, preferably at least 1100 MPa, more preferably at least 1200 MPa and/or
- a melting temperature ($T_m$) determined by differential scanning calorimetry (DSC) according to ISO 11357-3:2018 standard using a heating rate of 2° C./min of at or above 115° C., preferably at or above 125° C., more preferably at or above 135° C., even more preferably at or above 145° C., still more preferably at or above 155° C. and/or
- a melt flow index (230° C./2.16 kg) determined according to ISO 1133 standard of not more than 100 g/10 min, preferably not more than 50 g/10 min, more preferably not more than 35 g/10 min, even more preferably not more than 15 g/10 min, such as 0.5-15 g/10 min, preferably 1-10 g/10 min, more preferably 1-5 g/10 min.

According to one or more embodiments, the at least one polypropylene comprises or consists of polypropylene homopolymer, preferably an isotactic polypropylene, preferably having an isotactic index determined by means of $^{13}$C-NMR spectroscopy of at least 80%, preferably at least 85%, more preferably at least 90%.

According to one or more embodiments, the polymer composition further comprises at least 1 wt.-%, preferably at least 5 wt.-%, more preferably at least 7.5 wt.-%, of at least one polyethylene, based on the total weight of the polymer composition. Without being bound to any theory, it is believed that due to the polymer composition of the filaments comprising both polypropylene and polyethylene, the boundary between the partially fused filaments is more easily torn than in case of filaments composed of polyethylene or polypropylene alone. This is believed to enhance the ability of the fibers to undergo a progressive fibrillation when mechanically agitated within a matrix to be reinforced with the fibers. According to one or more embodiments, the at least one polyethylene comprises 1-30 wt.-%, preferably 5-25 wt.-%, more preferably 10-20 wt.-%, of the total weight of the polymer composition.

Suitable polyethylenes include ethylene homopolymers and ethylene copolymers.

According to one or more embodiments, the at least one polyethylene has

- a melting temperature ($T_m$), determined by differential scanning calorimetry (DSC) according to ISO 11357-3 standard using a heating rate of 2° C./min, of at or above 90° C., preferably at or above 100° C., more preferably at or above 105° C., such as 90-140° C., preferably 100-135° C., more preferably 105-125° C. and/or
- a melt flow index (190° C./2.16 kg) determined according to ISO 1133 standard of not more than 100 g/10 min, preferably not more than 50 g/10 min, more preferably not more than 35 g/10 min, even more preferably not more than 15 g/10 min, such as 0.5-15 g/10 min, preferably 1-10 g/10 min, more preferably 1-5 g/10 min.

According to one or more embodiments, the at least one polyethylene comprises or consists of low-density polyethylene (LDPE) or linear low-density polyethylene (LLDPE), or high-density polyethylene (HDPE), preferably linear low-density polyethylene (LLDPE).

The macro-synthetic fiber has a multi-lobal cross-sectional shape with three or more lobes. The term "fiber cross-section" refers in the present disclosure to a fiber cross section that has been cut into a plane perpendicular to the longitudinal direction of the fiber. In analogy, the term "cross-sectional shape" of a fiber refers to a shape of a cross-section that has been cut into a plane perpendicular to the longitudinal direction of the fiber.

Preferably, the macro-synthetic fiber has a multi-lobal cross-sectional shape with three or more lobes and a central section running axially through the fiber.

The central section of the fiber is preferably solid, i.e. it does not include an axial hole or a void. According to one or more embodiments, at least two of said lobes extend outwardly, preferably radially from the central section. According to one or more embodiments, at least two of said lobes are connected to each other through the central section.

Preferably, each lobe has a tip portion and a base portion situated towards the central section of the fiber. Furthermore, the tip portion of each lobe is preferably curved, more preferably convexly curved. FIG. 1 shows schematically the cross-sectional shape of a macro-synthetic fiber according to one embodiment of the present invention composed of four partially fused filaments, wherein the fiber (1) has a quadrilobal cross-sectional shape with four lobes (2) extending outwardly from the central section (3) of the fiber.

According to one or more embodiments, the base portion of each lobe has a width (D2) that is smaller than the maximum width (D1) of the tip portion. The term "maximum width of the tip portion" refers to the length of the longest line extending perpendicularly to a longitudinal line connecting the central section of the fiber with the tip portion of the lobe, wherein the longitudinal line extends toward the outline of the lobe. The term "width of the base portion" refers to the length of a line connecting two end points of the base portion of two adjacent lobes. In FIG. 1, the maximum width of the tip portion of a lobe (2) is indicated by the letter "D1", the width of the base portion of the lobe (2) is indicated by the letter "D2", and the longitudinal line connecting the central section (3) of the fiber with the tip portion of the lobe (2) is indicated with letter "L". The widths D1 and D2 can be determined from a microscopic picture of a fiber cross-section.

According to one or more embodiments, in each lobe, the ratio between the maximum width of the tip portion to the width of the base portion (D1:D2) is from 1.1:1 to 3:1, preferably from 1.2:1 to 2.7:1, more preferably from 1.3:1 to 2.5:1. Macro-synthetic fibers having the ratio between the maximum width (D1) of the tip portion to the width (D2) of the base portion in the above mentioned ranges have been found out to be advantageous since the lobes, and thus the partially fused filaments of the fiber, tend to be peeled away or separated from around the base portion by shearing force thus enabling progressive fibrillation when the fibers are mechanically agitated within a matrix material to be reinforced.

According to one or more embodiments, the macro-synthetic fiber is composed of four partially fused filaments. In these embodiments, the macro-synthetic fiber preferably has a quadri-lobal cross-sectional shape with four lobes, wherein preferably at least two of said lobes extend outwardly, more preferably radially from the central section of the fiber. Such macro-synthetic fibers have been found out to be highly effective in improving the toughness of concrete and to exhibit a good dispersibility in a concrete mixture and good surface finishing properties. According to one or more embodiments, the macro-synthetic fiber has a quadrilobal cross-sectional shape with four lobes extending outwardly, preferably radially, from the central section of the fiber.

Preferably, the macro-synthetic fiber has a linear density of at least 1000 den, more preferably at least 1200 den, even more preferably at least 1300 den, still more preferably at least 1500 den. The term "den" is abbreviation of "denier", which refers in the present disclosure to a unit of measure for the linear mass density of fibers, i.e. the mass in grams per 9000 meters of the fiber.

Preferably, the macro-synthetic fiber has a length of at least 15 mm, more preferably at least 20 mm, even more preferably at least 25 mm, still more preferably at least 30 mm and/or an aspect ratio (l/d) of not more than 85, more preferably not more than 80, even more preferably not more than 75, still more preferably not more than 70 and/or a fiber diameter of at least 0.25 mm, more preferably at least 0.35 mm, even more preferably at least 0.45, still more preferably at least 0.5 mm. The term "aspect ratio" refers in the present disclosure to the ratio of the length and diameter of the fiber. The term "fiber diameter" refers in the present disclosure to the equivalent diameter of the fiber determined according to EN 14889-2:2006 standard.

According to one or more embodiments, the macro-synthetic fiber has:

- a linear density of 1000-5000 den, preferably 1500-4500 den, more preferably 2000-4000 den, even more preferably 2500-3500 den,
- a length of 15-100 mm, preferably 20-85 mm, more preferably 25-75 mm, even more preferably 25-65 mm, still more preferably 30-60 mm and/or
- an aspect ratio (l/d) of 15-85, preferably 25-80, more preferably 35-75, even more preferably 40-70, still more preferably 45-70 and/or
- a fiber diameter of 0.25-1.5 mm, preferably 0.35-1.25 mm, more preferably 0.45-1.0 mm, even more preferably 0.5-0.9 mm, still more preferably 0.55-0.8 mm.

Preferably, the macro-synthetic fiber has:

- an elastic modulus an elastic modulus determined at 23° C. and at a strain rate of 5%/min according to EN 14889-2:2006 standard of at least 5 MPa, preferably at least 7 MPa and/or
- an elongation at break determined at 23° C. according to EN 10002-1:2001 standard of not more than 15%, preferably not more than 10% and/or
- a tensile strength determined at 23° C. and at a strain rate of 5%/min according to EN 14889-2:2006 standard of at least 250 MPa, preferably at least 350 MPa.

Macrosynthetic fibers with the physical properties falling within the above cited ranges have been found out to be particularly suitable for use as concrete reinforcing fibers.

The macro-synthetic fibers are preferably drawn with a draw ratio of at least 5:1, more preferably 10:1. Drawing results in orientation of the polymer chains in a longitudinal direction of the fiber, which increases the tensile strength and decrease elongation of the fiber. Furthermore, drawn fibers are typically less stretchable in a width direction. Finally, drawing also weakens the connecting region between the partially fused filaments resulting in more effective fibrillation during mixing with a concrete matrix.

According to one or more embodiments, macro-synthetic fiber is uniaxially drawn with a draw ratio of from 7.5:1 to 25:1, preferably from 10:1 to 20:1, more preferably from 10:1 to 17.5.1, even more preferably from 12:1 to 15:1.

Preferably, the macro-synthetic fiber is separable into single filaments having a linear density of not more than 1250 den, preferably not more than 1000 den, more preferably not more than 900 den and/or an aspect ratio (l/d) of at least 100, preferably at least 105, more preferably at least 110, even more preferably at least 115.

According to one or more embodiments, the macro-synthetic fiber is separable into single filaments having:

- a linear density of 150-1250 den, preferably 250-1150 den, more preferably 350-1000 den, even more preferably 400-950 den and/or
- an aspect ratio (l/d) of 100-250, preferably 105-200, more preferably 110-175, even more preferably 115-150 and/or
- a filament diameter of 0.1-1.0 mm, preferably 0.15-0.85 mm, more preferably 0.2-0.7 mm, even more preferably 0.2-0.55 mm, still more preferably 0.25-0.5 mm.

The macro-synthetic fiber may further be crimped or embossed, preferably crimped, to include one or more deformations in the fiber length. Crimping has been found out to reduce the stiffness of the fibers and to improve the fibrillation properties. The number of crimps in the fiber length is not particularly restricted. Generally, the number of crimps should be high enough to provide the fiber with improved fibrillation properties while not having a negative impact on other properties, such as dispersion properties of the fibers. According to one or more embodiments, the macro-synthetic fiber comprises a deformation formed in the fiber length, wherein the deformation comprises at least one crimp, preferably at least three crimps in the fiber length.

The preference given above for the at least one polypropylene and the at least one polyethylene apply to all subjects of the present invention unless specified otherwise.

Another subject of the present invention is a method for producing macro-synthetic fibers comprising steps of:

I) Extruding a molten polymer composition comprising at least one polypropylene through an extruder die to provide undrawn fibers consisting of three or more partially fused filaments, II) Uniaxially drawing the undrawn fibers prepared in step I) to provide drawn fibers, III) Optionally crimping the drawn fibers prepared in step II) to provide crimped fibers, and IV) Cutting the fibers prepared in step II) or III) to a pre-determined length.

Preferably, the at least one polypropylene comprises at least 70 wt.-%, more preferably at least 75 wt.-% of the molten polymer composition.

According to one or more embodiments, the molten polymer composition further comprises at least 1 wt.-%, preferably at least 5 wt.-%, of at least one polyethylene, based on the total weight of the molten polymer composition.

According to one or more embodiments, the at least one polypropylene comprises 70-95 wt.-%, preferably 75-90 wt.-%, more preferably 80-90 wt.-%, of the molten polymer composition and the at least one polyethylene comprises 1-30 wt.-%, preferably 5-25 wt.-%, more preferably 10-20 wt.-%, of the molten polymer composition.

The molten polymer composition is preferably obtained by melt-blending a starting composition comprising the constituents of the molten polymer composition using a suitable mixing apparatus. The term "melt-blending" refers in the present disclosure to a process, in which at least one molten polymeric component is intimately mixed with at least one other component, which may be another molten polymeric component or a solid component, such as a filler, until a melt blend, i.e. a substantially homogeneously blended mixture of the polymeric component(s) and the other constituents is obtained.

The melt-blending of the starting composition can be conducted as a batch process using any conventional mixer, such as a Brabender, Banbury, or roll mixer or as continuous process using a continuous type mixer, preferably an extruder, such as a single screw or a twin-screw extruder or a planetary roller extruder. The constituents of the starting composition are preferably fed into the mixer using a conventional feeding system comprising a feed hopper and feed extruder. Alternatively, some or all the constituents of the starting composition may be directly fed into the mixer as individual streams, as a pre-mix, or as a master batch. Furthermore, the constituents of the starting composition can first be processed in a compounding extruder to pellets or granules, which are then fed into the mixer.

In the first step I) of the method, the molten polymer composition is extruded through an extruder die as filaments to provide undrawn fibers consisting of three of more partially fused filaments. The extruder die is preferably a spinneret comprising a plurality of spinneret orifices containing holes, through which the molten polymer composition is extruded.

According to one or more embodiments, step I) of the method comprises steps of:

i) Extruding the molten polymer composition through a spinneret comprising a plurality of spinneret orifices to provide undrawn fibers and ii) Conducting said undrawn fibers prepared in step i) via an air gap into a cooling bath, wherein at least part of said spinneret orifices, preferably each spinneret orifice, consist of an assembly of three or more holes that are proximately disposed such that when the molten polymer composition is extruded through said holes, the thus obtained extruded filaments are partially fused to form an undrawn fiber. The term "air gap" refers here to the gap between spinneret and cooling bath.

In the second step II) of the method, the undrawn fibers prepared in step I) are uniaxially drawn to provide drawn fibers. According to one or more embodiments, the extruded undrawn fibers are uniaxially drawn with a draw ratio of from 7.5:1 to 25:1, preferably from 10:1 to 20:1, more preferably from 10:1 to 17.5.1, even more preferably from 12:1 to 15:1. Drawing of the fibers can be conducted by using a conventional heat stretching machine, such as a hot-roll, a hot-plate or a hot-air oven type of machine.

Drawing results in orientation of the polymer chains in a longitudinal direction of the fiber, which increases the tensile strength and decreases elongation of the undraw fiber. Furthermore, drawn fibers are typically less stretchable in a width direction. Finally, drawing also weakens the connecting region between the partially fused filaments resulting in more effective fibrillation during mixing with a concrete matrix.

According to one or more embodiments, step III) of the method comprises subjecting the drawn fibers prepared in step II) to crimping to provide crimped fibers. Crimping of the fibers can be conducted employing any conventional crimping apparatus, such as a crimper box, for example a tow crimper. In case of a crimper box, the drawn fibers are loaded into the crimper box which stuffs and bends the crimps into the fibers. The drawn fibers can also be mechanically crimped by running the fibers through a gear or set of gears to provide crimps into the fibers. According to one or more embodiments, the drawn fibers prepared in step II) are crimped by running the fibers through set of gears.

In the fourth step IV) of the method, the drawn and optionally crimped fibers prepared in step II) or III) are cut into pieces with a predetermined length. According to one or more embodiments, said drawn and optionally crimped fibers have:

a length of 15-100 mm, preferably 20-85 mm, more preferably 25-75 mm, even more preferably 25-65 mm, still more preferably 30-60 mm and/or an aspect ratio (l/d) of 15-85, preferably 25-80, more preferably 35-75, even more preferably 40-70, still more preferably 45-70 and/or a fiber diameter of 0.25-1.5 mm, preferably 0.35-1.25 mm, more preferably 0.45-1.0 mm, even more preferably 0.5-0.9 mm, still more preferably 0.55-0.8 mm and/or an elastic modulus an elastic modulus determined at 23° C. and at a strain rate of 5%/min according to EN 14889-2:2006 standard of at least 5 MPa, preferably at least 7 MPa and/or an elongation at break determined at 23° C. according to EN 10002-1:2001 standard of not more than 15%, preferably not more than 10% and/or a tensile strength determined at 23° C. and at a strain rate of 5%/min according to EN 14889-2:2006 standard of at least 250 MPa, preferably at least 350 MPa.

Figure 2:
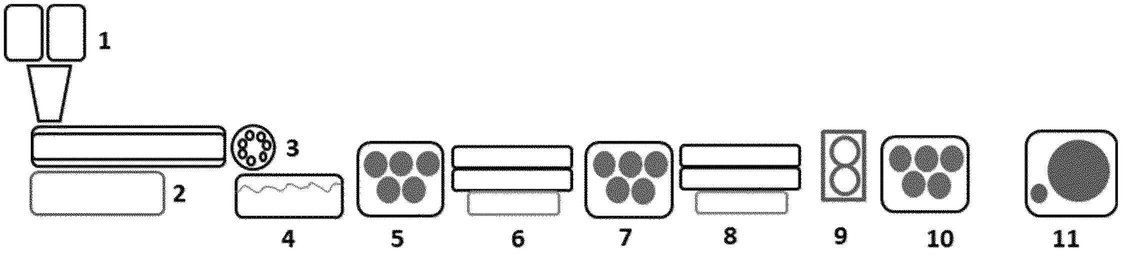
FIG. 2 shows a schematic presentation of one possible process for producing macro-synthetic fibers of the present invention.

FIG. 2 shows a schematic presentation of one embodiment of the method for producing macro-synthetic fibers of the present invention. In this embodiment, the constituents of the starting composition are fed using a metering and feeding apparatus (4) into an extruder apparatus (5), where the starting is melt-processed into a molten polymer composition. The melt-processed starting composition is extruded though a spinneret (6) comprising a plurality of spinneret orifices. After that the extruded fibers are conducted through an air gap into a water bath (7). The cooled fibers are conveyed from the water bath (7) into a first (stretching) oven (9) using a powered takeaway roller comprising a first roll stand (8). The undrawn fibers are orientated in the first (stretching) oven (9), drawn using a second roll stand (10), and further processed in a second (annealing) oven (11). The heating in the first and second oven (9, 11) is preferably achieved with forced hot air at a controlled temperature.

The drawn fibers are passed from the second oven (11) through a mechanical crimper (12) comprised of two matched rolls that partially engaged to deform the drawn fiber. The crimped fibers are conveyed from the crimper using a third roll stand (13), winded by using a winder (14), and cut to a predetermined length (not shown in FIG. 2).

According to one or more embodiments, the undrawn fibers consist of three to six partially fused filaments. In these embodiments, at least part of said spinneret orifices consist of an assembly of three to six holes that are proximately disposed.

The shape of the holes of said assembly is not particularly restricted. The cross-section of the holes can have a circular, elliptical, trilobal, or triangular shape, or a Y-shape, or a star shape, preferably a circular shape.

The holes of said assembly can have the same diameter or different diameter, preferably the same diameter. Preferably, diameter of the holes is not more than 5.0 mm, more preferably not more than 4.0 mm, even more preferably not more than 3.0 mm. According to one or more embodiments, the holes of said assembly have a diameter of 0.35-2.5 mm, preferably 0.5-2.0 mm, more preferably 0.75-2.0 mm, even more preferably 0.85-1.75 mm, still more preferably 0.95-1.75 mm.

Preferably, the holes of said assembly are proximately disposed but not overlapping, i.e. the distance between adjacent holes of said assembly is arranged such that the perimeters of the holes are not intersecting each other.

On the other hand, the distance between centers of two adjacent holes should not be too high to prevent the extruded filaments from contacting and partially fusing to each other. According to one or more embodiments, the holes of said assembly are disposed such that the distance between perimeters of any two holes that are closest to each other measured along a line connecting the centers of said two holes is not more than 1.0 mm, preferably not more than 0.85 mm, more preferably not more than 0.75 mm.

According to one or more preferred embodiments, the undrawn fibers consist of four partially fused filaments. In these embodiments, at least part of said spinneret orifices consist of an assembly of four holes that are proximately disposed.

According to one or more preferred embodiments, the four holes of said assembly are arranged in a form of a quadrangle, preferably selected from the group consisting of a trapezoid, kite, parallelogram, rhombus, rectangle, or a square. The expression "arranged in form of a quadrangle" is understood to mean that the centers of the holes of said assembly are located at the intersection points of the sides of the quadrangle.

The spinneret orifices of said spinneret can be positioned in any conventional form, for example in plurality of parallel rows or concentric circles. According to one or more preferred embodiments, all the spinneret orifices of said spinneret consist of an identical assembly of holes in terms of the number, geometrical arrangement, shape, and size of holes.

According to one or more embodiments, the method for producing macro-synthetic fibers comprises further steps of:

V) Packaging the fibers prepared in any one of steps II) to IV) into compact bundles each containing several thousand fibers and VI) Wrapping the bundles prepared in step V) within a water-soluble plastic film.

In case the fibers packed into bundles in step V) have not been cut into a pre-determined length, the method can comprise a further step VII) of cutting the wrapped bundles prepared in step VI) into a pre-determined length.

Another subject of the present invention is macro-synthetic fibers obtained by using the method for producing macro-synthetic fibers of the present invention.

Still another subject of the present invention is the use of the macro-synthetic fibers of the present invention improving properties, preferably toughness, of a hardened cementitious composition.

The term "cementitious composition" refers in the present disclosure to concrete, shotcrete, grout, mortar, paste or a combination thereof. The terms "paste", "mortar", "concrete", "shotcrete", and "grout" are well-known terms for person skilled in the art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a Portland cement, water, and fine and/or coarse aggregate, to produce a specific cementitious composition.

According to one or more embodiments, the cementitious composition is selected from the group consisting of concrete, shotcrete, grout, and mortar, preferably concrete and shotcrete, more preferably concrete.

According to one or more embodiments, the macro-synthetic fibers are added to the cementitious composition in an amount of 0.1-3.0 vol.-%, preferably 0.2-2.0 vol.-%, more preferably 0.2-1.0 vol.-%, based on the total volume of the hardened cementitious composition.

According to one or more embodiments, the toughness of hardened cementitious composition measured as a residual strength after first break has occurred, is improved by at least 5%, preferably at least by 10%, more preferably at least by 15%, compared to the toughness of a hardened cementitious composition not containing the macro-synthetic fibers of the present invention.

Still another subject of the present invention is cementitious material comprising:

a) A binder, b) 0.1-3.0 vol.-%, preferably 0.2-2.0 vol.-%, more preferably 0.2-1.0 vol.-%, based on the total volume of the cementitious material, of macro-synthetic fibers according present invention, c) Aggregates, and d) Water.

According to one or more embodiments, the binder a) is selected from the group consisting of hydraulic binders, non-hydraulic binders, latent hydraulic binders, and pozzolanic binders.

The term "hydraulic binder" refers to substances, which react with water in a hydration reaction under formation of solid mineral hydrates or hydrate phases, which are not soluble in water or have a low water-solubility. Therefore, hydraulic binders, such as Portland cement, can harden and retain their strength even when exposed to water, for example underwater or under high humidity conditions. In contrast, the term "non-hydraulic binder" refers to substances, which harden by reaction with carbon dioxide and which, therefore, do not harden in wet conditions or under water.

Examples of suitable hydraulic binders include hydraulic cements and hydraulic lime. The term "hydraulic cement" refers here to mixtures of silicates and oxides including alite, belite, tricalcium aluminate, and brownmillerite.

Commercially available hydraulic cements can be divided in five main cement types according to DIN EN 197-1, namely, Portland cement (CEM I), Portland composite cements (CEM II), blast-furnace cement (CEM III), pozzolan cement (CEM IV) and composite cement (CEM V). These five main types of hydraulic cement are further subdivided into an additional 27 cement types, which are known to the person skilled in the art and listed in DIN EN 197-1. Naturally, all other hydraulic cements that are produced according to another standard, for example, according to ASTM standard or Indian standard are also suitable.

Examples of suitable non-hydraulic binders include air-slaked lime (non-hydraulic lime) and gypsum. The term "gypsum" refers in the present disclosure to any known form of gypsum, in particular calcium sulfate dehydrate, calcium sulfate α-hemihydrate, calcium sulfate ß-hemihydrate, or calcium sulfate anhydrite or mixtures thereof.

The term "latent hydraulic binder" refers in the present disclosure to type II concrete additives with a "latent hydraulic character" as defined in DIN EN 206-1:2000 standard. These types of mineral binders are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases.

Examples of suitable latent hydraulic binders include ground granulated blast furnace slag. Ground granulated blast furnace slag is typically obtained from quenching of molten iron slag from a blast furnace in water or steam to form a glassy granular product and followed by drying and grinding the glassy into a fine powder.

The term "pozzolanic binder" refers in the present disclosure to type II concrete additives with a "pozzolanic character" as defined in DIN EN 206-1:2000 standard. These types of mineral binders are siliceous or aluminosilicate compounds that react with water and calcium hydroxide to form calcium silicate hydrate or calcium aluminosilicate hydrate phases.

Examples of suitable pozzolanic binders include natural pozzolans, such as trass, and artificial pozzolans, such as fly ash and silica fume. The term "fly ash" refers in the present disclosure to the finely divided ash residue produced by the combustion of pulverized coal, which is carried off with the gasses exhausted from the furnace in which the coal is burned. The term "silica fume" refers in the present disclosure to fine particulate silicon in an amorphous form. Silica fume is typically obtained as a by-product of the processing of silica ores such as the smelting of quartz in a silica smelter which results in the formation of silicon monoxide gas and which on exposure to air oxidizes further to produce small particles of amorphous silica.

According to one or more embodiments, the binder is a hydraulic binder, preferably a hydraulic cement, such as Portland cement.

Suitable aggregates to be used in the cementitious material include both coarse and fine (sand) aggregates as well as pebbles and rocks of various sizes, typically in the range of 10 mm-20 mm (⅜"-¾"). According to one or more embodiments, the cementitious material is a fiber-reinforced concrete composition.

According to one or more embodiments, the weight ratio of the amount of water to the amount of the binder is in the range of 0.2:1 to 0.7:1, preferably 0.3:1 to 0.6:1, more preferably 0.4:1 to 0.6:1, even more preferably 0.45:1 to 0.55:1.

Still another subject of the present invention is a method for forming a concrete surface comprising steps of:

I. Adding macro-synthetic fibers according to the present invention into a fluidized concrete mixture under mixer rotation to provide a modified concrete mixture,
II. Casting the modified concrete mixture prepared in step I. to provide a casted concrete body,
III. Smoothing the surface of the casted concrete body prepared in step II., and
IV. Curing the modified concrete mixture.

According to one or more embodiments, said fluidized concrete mixture comprises a binder, aggregates, and water.

The weight ratio of the amount of water to the amount of the binder is preferably in the range of from 0.2:1 to 0.7:1, more preferably 0.3:1 to 0.6:1, even more preferably 0.4:1 to 0.6:1, still more preferably 0.45:1 to 0.55:1.

Preferred binders and aggregates have already been discussed above in relation to the cementitious material of the present invention.

According to one or more embodiments, the modified concrete mixture comprises 0.1-3.0 vol. %, preferably 0.2-2.0 vol. %, more preferably 0.2-1.0 vol. %, of the macro-synthetic fibers, based on the total volume of the hardened cementitious composition.

Smoothing of the surface of the casted concrete body can be conducted, for example, by using a pallet or a trowel.

Examples

The followings compounds shown in Table 1 were used in the examples:

TABLE 1

| | |
|---|---|
| Polypropylene | Isotactic PP homopolymer, melt flow rate (230° C., 2.16 kg) 2 g/10 min, melting point (ASTM D1238) 164° C. |
| Polyethylene | LLDPE, melt flow rate (190° C., 2.16 kg) 0.9 g/10 min, density 0.918 g/cm$^3$ (ASTM D1505) |
| Additive | Grey color pigment |
| Type I/II cement | Coosa - Leeds, AL |
| Natural sand | Lambert Sand Co. |
| #57 stone granite | Vulcan - Lithonia, GA |
| Potable water | Lawrenceville, GA |

Preparation of Macro-Synthetic Fibers

The inventive and reference macro-synthetic fibers were produced with a process, which is schematically presented in FIG. 2.

The raw materials of the macro-synthetic fibers fed using a metering and feeding apparatus (4) into an extruder (5) comprising a 110 mm single screw extruder with an L/D ratio of 32:1 and two melt pumps feeding two circular dies. The melt-processed composition was extruded though an extruder die (6) comprising a plurality of spinneret orifices consisting of an assembly of holes and the extruded fibers were conducted over an air gap into a water bath (7). The downstream equipment was a powered takeaway roller comprising a first roll stand (8) equipped with five rolls and a nip roll on the exit roller.

The undrawn fibers obtained from the exit roller were orientated in a first (stretching) oven (9), drawn using a second roll stand (10) composed of seven rollers, and further processed in a second (annealing) oven (11) to obtain drawn fibers. The heating in the first and second oven (9, 11) was achieved with forced hot air at a controlled temperature.

In some cases, the drawn fibers obtained from the second oven (11) were passed through a mechanical crimper (12) comprised of two matched rolls that partially engaged to deform the drawn fiber. After exiting the crimper (12), the fibers were further processed through the third roll stand (13) composed of seven rolls with the exit roll having a nip roll. Finally, the drawn and crimped fibers were winded by using a winder (14) and cut to a predetermined length.

The macro-synthetic fibers of inventive example Ex-1 were produced using an extruder die with a plurality of spinneret orifices, wherein each orifice consisted of an assembly of four non-intersecting round holes arranged in form of a quadrangle. The produced fibers had a multi-lobal cross-sectional shape with four lobes extending radially from the center of the fiber as shown schematically in FIG. 1.

The macro-synthetic fibers of reference example Ref-1 were produced using an extruder die with a plurality of spinneret orifices, wherein each orifice consisted of an assembly of three intersecting round holes arranged in form of a triangle. The fibers had a multi-lobal cross-section with the lobes extending radially from the center of the fiber. Individual fibers were not composed of "fused filaments", since there were no spaces between the perimeters of the holes of the spinneret orifices. Consequently, each fiber was extruded as a single filament. The extruded fibers were mechanically fibrillated but not crimped.

The macro-synthetic fibers of reference example Ref-2 were produced using an extruder die with a plurality of spinneret orifices, wherein each orifice consisted of an assembly of four round holes connected by a cut line arranged in form of a straight row. Individual fibers were not composed of "fused filaments", since there were no spaces between the perimeters of the holes of the spinneret orifices. Consequently, each fiber was extruded as a single filament. The extruded fibers were mechanically fibrillated but not crimped.

The macro-synthetic fibers of reference example Ref-3 were produced using an extruder die with a plurality of spinneret orifices, wherein each orifice consisted of an assembly of one round hole. Individual fibers were not composed of "fused filaments", since the spinneret orifices consisted of one single hole. Consequently, each fiber was extruded as a single filament.

Elastic Modulus, Tensile Strength, Elongation at Break

Elastic modulus and tensile strength at break were determined at 23° C. and at a strain rate of 5%/min according to EN 14889-2:2006 standard. Elongation at break was determined at 23° C. according to EN 10002-1:2001 standard.

Use of Fibers in Cementitious Material

The goal was to test the effect addition of macro synthetic fibers at different dosages to a typical concrete mix having a compressive strength of 24-31 MPa at an age of 7 days.

The concrete was batched and mixed in accordance with ASTM C192-19 *Standard Practice for Making and Curing Concrete Test Specimens in the Laboratory*. The fibers were added at the beginning of the batch sequence and mixed with the rock and sand for one minute prior to the addition of the cementitious material. The concrete was then mixed for 3 minutes, allowed to rest for 3 minutes, and mixed for 2 additional minutes and casted into molds. The Plastic properties were then determined and recorded in accordance with the applicable ASTM standards. Hardened properties after 7 days were tested with cylinders having dimensions of 6"×12" (150×300 mm) and with beams having dimensions of 6"×6"×20" (150×150×500 mm) in accordance with ASTM C1609-19a. Mix proportions, plastic, and hardened properties are shown in Tables 3 and 4. The values for hardened properties were calculated as averages of measured values obtained from measurements with six beams.

Casting of the 6"×6"×20" beam specimens was performed by discharging the concrete directly from the wheel barrow into the mold and filling to a height of approximately 1-2 inches above the rim. The 6"×12" cylinder molds were filled using a scoop to a height of approximately 1-2 inches above the rim of the mold. Both the beam and cylinder specimens were then consolidated by means of an external vibrating table at a frequency of 60 Hz. The consolidation was determined to be adequate once the mortar contacted all of the interior edges, as well as the corners of the mold, and no voids greater than ⅛" diameter were observed. Care was taken to ensure that all specimens were vibrated for the same duration of time and in concurrent sets. The specimens were then finished with an aluminum trowel and moved to a level surface. Specimens were covered with wet burlap and plastic in a manner as to not disturb the surface finish and prevent moisture loss. After curing in the mold for 24 hours the hardened specimens were removed from the molds and placed in a saturated lime bath at 23±2° C. until the time of testing.

Six beams specimens were tested from each mix at an 18" (450 mm) span length using roller supports meeting the requirements of ASTM C1812-15 *Standard Practice for Design of Journal Bearing Supports to be Used in Fiber Reinforced concrete Beam Tests*. The test machine used was a Satec-Model 5590-HVL closed-loop, dynamic servo-hydraulic, testing machine conforming to the requirements of ASTM E4-20 Standard Practices for Force Verification of Testing Machines. Load and deflection data were collected electronically at a frequency of 5 Hertz. The load was applied perpendicular to the molded surfaces after the edges were ground with a rubbing stone. Net deflection values, for both data acquisition and rate control, were obtained at the mid-span and midheight of the beams. The rate was held constant at 0.002 in/min of average net deflection for the entire duration of each test.

TABLE 2

| Polymer composition [wt.-%] | Ex-1 | Ref-1 | Ref-2 | Ref-3 |
|---|---|---|---|---|
| Polypropylene | 79 | 80 | 80 | 65 |
| Polyethylene (LLDPE) | 20 | 20 | 20 | 35 |
| Additive | 1 | 0 | 0 | 0 |

TABLE 2-continued

| Polymer composition [wt.-%] | Ex-1 | Ref-1 | Ref-2 | Ref-3 |
|---|---|---|---|---|
| Process | | | | |
| Orifice geometry | 4 non-intersecting round holes in form of quadrangle (multi-filament) | 3 intersecting round holes in form of triangle (monofilament) | 4 round holes connected by a cut line (monofilament) | 1 round hole (monofilament) |
| Hole diameter [mm] | 1.25 | 0.64 | 0.76 | 2.2 |
| Distance between holes | <1.25 mm | Connected | Connected | Single hole |
| Extruder profile temperature [° C.] | 210-235 | 204-238 | 204-232 | 210-235 |
| Extrusion line speed [fps] | 149 | 257 | 300 | 217-355 |
| Draw ratio | 14:1 | 12.5:1 | 11.3:1 | 11:1 |
| Draw oven temperature [° C.] | 141 | 160 | 160 | 171 |
| Annealing oven temperature [° C.] | 143 | n./a. | n./a. | 177 |
| Fiber properties | | | | |
| Fiber length [mm] | 38 | 38 | 38 | 38 |
| D1:D2 ratio | 2 | <1 | n./a. | n./a. |
| Deformation type | Crimping | Mechanical fibrillation | Mechanical fibrillation | None |
| Linear density [den] | 2800 | 1600 | 2020 | 1508 |
| Tensile strength (non-deformed) [MPa] | 587 | 625 | 603 | 598 |
| Elongation (non-deformed) [%] | 8 | 6.2 | 10 | 8.4 |
| Elastic modulus (non-deformed) [Gpa] | 12.7 | 11 | 9.1 | 10.6 |
| Tensile strength (deformed) [MPa] | 567 | 485 | 423 | 450 |
| Elongation (deformed) [%] | 9.3 | 5 | 7 | 8 |
| Elastic modulus (deformed) [Gpa] | 8.5 | 11.0 | 9.2 | 9 |

TABLE 3

| | | Compositions | | | | | |
|---|---|---|---|---|---|---|---|
| | ASTM | Weight [kg/m$^3$] | Volume [dm$^3$] | Weight [kg/m$^3$] | Volume [dm$^3$] | Weight [kg/m$^3$] | Volume [dm$^3$] |
| Type I/II cement | C150 | 380 | 92.31 | 380 | 92.31 | 380 | 92.31 |
| Natural sand | C33 | 722 | 210.11 | 718 | 208.98 | 715 | 207.85 |
| #57 stone granite | C33 | 955 | 278.64 | 955 | 278.64 | 955 | 278.64 |
| Potable water | C94 | 218 | 167.07 | 218 | 167.07 | 218 | 167.07 |
| w/c ratio | | 0.575 | | 0.575 | | 0.575 | |
| Fibers of Ex-1 | D7508 | 1.78 | 1.42 | 2.97 | 2.55 | 4.15 | 3.40 |
| Design air 2.00% | C192 | NA | 15.29 | NA | 15.29 | NA | 15.29 |
| Total | | 2278 | 764.84 | 2275 | 764.84 | 2273 | 764.55 |
| Plastic properties | | | | | | | |
| Slump - After Fiber [mm] | C143 | 19.69 | | 17.78 | | 13.97 | |
| Air Content - After Fiber [%] | C231 | 1.5 | | 1.9 | | 1.4 | |
| Unit weight - After Fiber [kg/m$^3$] | C138 | 2297 | | 2292 | | 2302 | |
| Concrete Temperature [° C.] | C1064 | 22 | | 21 | | 22 | |
| Air Temperature [° C.] | C1064 | 22 | | 23 | | 22 | |
| After 7 days (cylinders) | | | | | | | |
| Compressive strength [MPa] | C39 | 26.75 | | 26.75 | | 26.06 | |

TABLE 4

| | | Fiber type Ex-1 Fiber dosage [kg/m$^3$] | | |
|---|---|---|---|---|
| After 7 days (beams) | | 1.78 | 2.97 | 4.15 |
| $\delta_1$ - Deflection at First Crack [mm] | C1609 | 0.0066 | 0.0061 | 0.0058 |
| $\delta_P$ - Deflection at Peak Load [mm] | C1609 | 0.0074 | 0.0069 | 0.0069 |
| $P_1$ - First Crack Load [kN] | C1609 | 29407 | 27610 | 25942 |
| $P_P$ - Peak Load [kN] | C1609 | 30324 | 29296 | 28024 |
| $P_{600}$ - Residual load at L/600 [kN] | C1609 | 5872 | 8354 | 10209 |
| $P_{150}$ - Residual load at L/150 [kN] | C1609 | 4973 | 7308 | 9484 |
| $f_1$ - First Crack Stress [kPa] | C1609 | 3827 | 3585 | 3344 |
| $f_P$ - Peak Stress [kPa] | C1609 | 3930 | 3792 | 3620 |
| $f_{600}$ - Residual stress at L/600 [kPa] | C1609 | 758 | 1103 | 1310 |

TABLE 4-continued

| | | Fiber type Ex-1 Fiber dosage [kg/m$^3$] | | |
|---|---|---|---|---|
| After 7 days (beams) | | 1.78 | 2.97 | 4.15 |
| $f_{150}$ - Residual stress at L/150 [kPa] | C1609 | 655 | 931 | 1241 |
| $T_{150}$ - Toughness at load L/150 [J] | C1609 | 19.8 | 27.1 | 33.4 |
| $f_{T,150}$ or $f_{e,3}$ [kPa] | C1609 | 848 | 1158 | 1420 |
| $R_{T,150}$ or $R_{e,3}$ [%] | C1609 | 22.3 | 32.3 | 42.2 |

The invention claimed is:

1. A macro-synthetic fiber consisting of three or more partially fused filaments made of a polymer composition comprising:

at least one polypropylene; and at least 1 wt.-% of at least one polyethylene, based on a total weight of the polymer composition;

wherein the fiber has a multi-lobal cross-sectional shape with three or more lobes and a central section of the fiber is solid.

2. The macro-synthetic fiber according to claim 1, wherein the macro-synthetic fiber is configured to undergo progressive fibrillation when mechanically agitated within a matrix material to be reinforced with the fiber.

3. The macro-synthetic fiber according to claim 1, wherein the at least one polypropylene comprises at least 70 wt.-% of the polymer composition.

4. The macro-synthetic fiber according to claim 1, wherein the central section runs axially through the fiber.

5. The macro-synthetic fiber according to claim 4, wherein each lobe has a curved tip portion and a base portion situated toward the central section of the fiber.

6. The macro-synthetic fiber according to claim 5, wherein the base portion has a width that is smaller than the maximum width of the tip portion.

7. The macro-synthetic fiber according to claim 5, wherein a ratio between the maximum width of the tip portion to a width of the base portion is from 1.1:1 to 3:1.

8. The macro-synthetic fiber according to claim 1 consisting of four partially fused filaments.

9. The macro-synthetic fiber according to claim 1 having a linear density of at least 1000 den and/or a fiber length of at least 20 mm and/or an aspect ratio of not more than 85 and/or a fiber diameter of at least 0.25 mm.

10. A method for improving toughness of a hardened cementitious composition, comprising adding the macro-synthetic fibers according to claim 1 to a cementitious composition, and then hardening the cementitious composition.

11. A cementitious material comprising:

a) a binder, b) 0.1-3.0 vol.-% based on a total volume of the cementitious material, of macro-synthetic fibers according to claim 1 c) aggregates, and d) water.

12. A method for forming a concrete surface comprising steps of:

I. adding macro-synthetic fibers according to claim 1 into a fluidized concrete mixture under mixer rotation to provide a modified concrete mixture, II. casting the modified concrete mixture prepared in step I. to provide a casted concrete body, III. smoothing the surface of the casted concrete body prepared in step II., and IV. curing the modified concrete mixture.

13. A method for producing macro-synthetic fibers comprising steps of:

I) extruding a molten polymer composition comprising:

at least one polypropylene to provide undrawn fibers consisting of three or more partially fused filaments, at least 1 wt.-% of at least one polyethylene, based on a total weight of the polymer composition, wherein the macro-synthetic fibers have a multi-lobal cross-sectional shape with three or more lobes and a central section of the macro-synthetic fibers is solid II) uniaxially drawing the undrawn fibers prepared in step I) to provide drawn fibers, III) optionally crimping the drawn fibers prepared in step II) to provide crimped fibers, and IV) cutting the fibers prepared in step II) or III) to a pre-determined length.

14. The method according to claim 13, wherein step I) comprises steps of:

i) extruding the molten polymer composition through a spinneret comprising a plurality of spinneret orifices to provide undrawn fibers, ii) conducting the undrawn fibers prepared in step i) via an air gap into a cooling bath, wherein at least part of the spinneret orifices consist of an assembly of three or more holes that are proximately disposed such that when the molten polymer composition is extruded through the holes, the thus obtained extruded filaments are partially fused to each other to form an undrawn fiber.

15. The method according to claim 14, wherein the distance between adjacent holes of the assembly is arranged such that the perimeters of the holes are not intersecting each other.

16. The method according to claim 14, wherein the assembly consists of four holes that are proximately disposed.

17. Macro-synthetic fibers obtained by using the method according to claim 13.

* * * * *